March 15, 1966 M. W. LA RUE, JR 3,240,871

FACSIMILE RECORDER PAPER DRIVE

Filed March 4, 1963 3 Sheets-Sheet 1

INVENTOR

Mervin W. La Rue, Jr.

BY William J. Newman

Attorney

March 15, 1966 M. W. LA RUE, JR 3,240,871

FACSIMILE RECORDER PAPER DRIVE

Filed March 4, 1963 3 Sheets-Sheet 2

INVENTOR
Mervin W. La Rue, Jr.

By William J. Newman
Attorney

INVENTOR
Mervin W. LaRue, Jr.

By William J. Newman
Attorney

United States Patent Office 3,240,871
Patented Mar. 15, 1966

3,240,871
FACSIMILE RECORDER PAPER DRIVE

Mervin W. La Rue, Jr., Barrington, Ill., assignor to Stewart-Warner Corporation, Chicago, Ill., a corporation of Virginia Filed Mar. 4, 1963, Ser. No. 262,594
13 Claims. (Cl. 178—6.6)

This invention relates to facsimile systems and more particularly to facsimile receivers of the type in which copy is reproduced on sensitized paper which has a tendency to lose its effectiveness when subjected to normal atmospheric conditions for a prolonged length of time.

For example, many facsimile receivers use an electrolytic paper which must be moist at the time it is subjected to the facsimile electric signals in order that the current may pass therethrough. This type paper is supplied to the user in a moist condition and it must be so maintained until the paper is subjected to the facsimile signals. These facsimile receivers usually include a more or less atmosphere proof compartment from which the paper is drawn past the scanning means during the operation of the device. During the intervals between facsimile transmission, there is usually a portion of the paper which is threaded through the receiver and past the scanning device which is subject to the atmosphere. During long periods of receiver inactivity the paper loses sufficient moisture so that either that paper is not marked by the facsimile signals, or it is burned by the marking current and tears. It is, therefore, an object of this invention to eliminate the effects of atmosphere exposed paper on receiver operation.

It is also an object of this invention to provide apparatus in a facsimile receiver by means of which fresh paper is exposed to the scanning means during the receipt of facsimile signals.

It is another object of this invention to provide an auxiliary paper drive means which causes the atmosphere exposed paper to pass the scanning means prior to the receipt of facsimile signals at the beginning of transmission.

An additional object of this invention is the provision of (new and improved) means for driving the paper through a facsimile receiver which causes the atmosphere exposed paper to be driven past the scanning means only when there is a predetermined extended interval between facsimile transmissions.

A further object of this invention is to provide new and improved apparatus of the foregoing character which is extremely effective and is remarkably simple and low in cost.

Another object of this invention is to provide new and improved apparatus of the foregoing character which may be added to existing facsimile receivers without requiring major modifications of the receiver.

Further objects and advantages of this invention will become apparent upon a further reading of this specification especially when taken in view of the accompanying drawings, in which.

Briefly, a facsimile receiver embodying the teachings of this invention comprises a circuit for receiving phasing and facsimile signals and a supply of electrically markable sensitized paper. Means are provided for moving the paper through the receiver at a predetermined rate during the receipt of facsimile copy reproducing signals with additional means for driving the paper at a faster rate for a predetermined interval at the beginning of facsimile transmission. The means for driving the paper at a faster rate is operative responsive to the phasing circuits in the receiver which are actuated only after a predetermined interval of receiver in operation. Thus, the paper which has been exposed to the atmosphere between the paper supply and the scanning means is rushed past the scanning device before the receipt of the copy reproducing facsimile signals.

Figure 1:
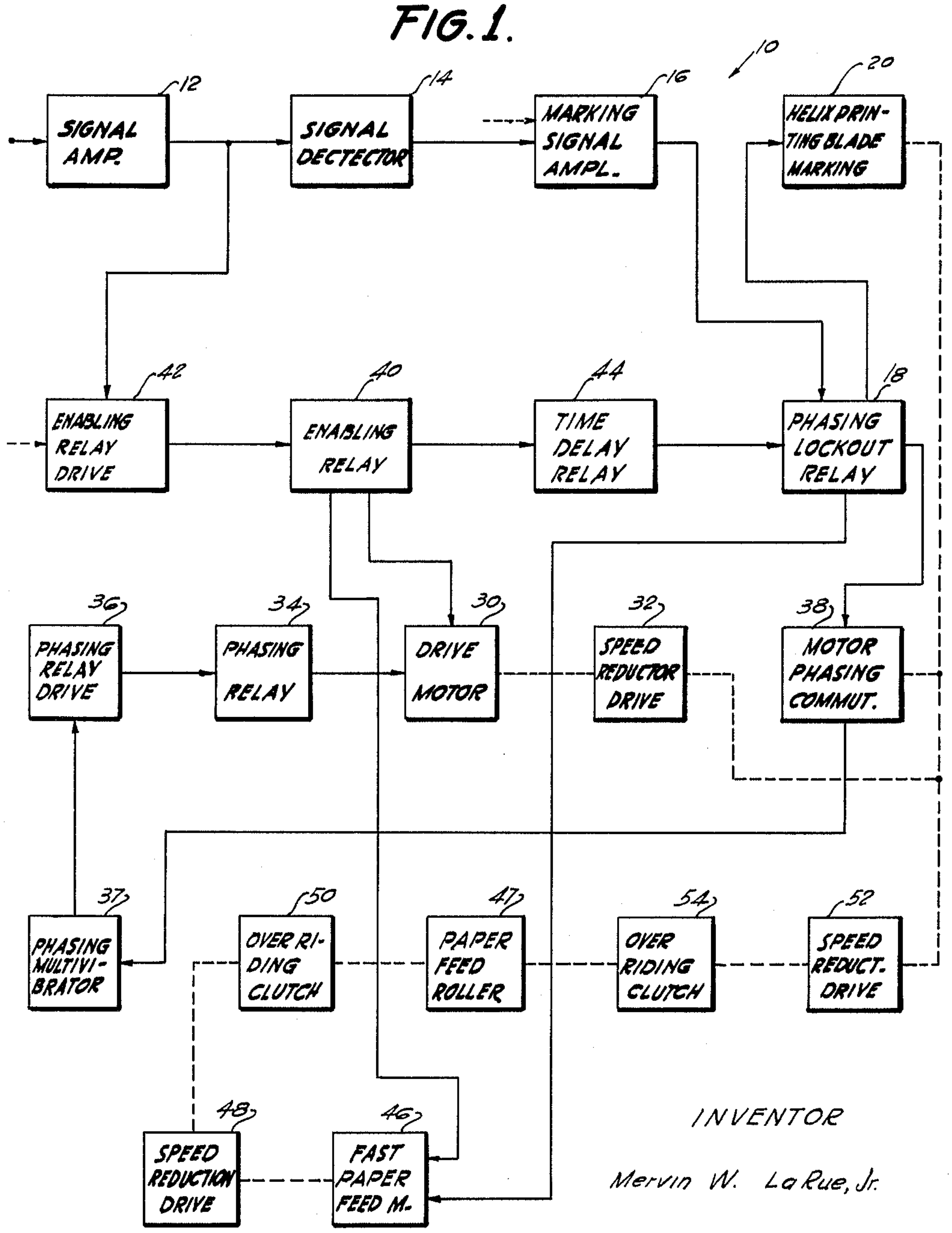
FIG. 1 is a block diagram of a facsimile receiver embodying the teachings of this invention.

Describing now more fully a preferred embodiment of this invention, reference is made first to FIG. 1 which illustrates a facsimile receiver 10. The facsimile signals received from the transmitting station are applied to the input of a signal amplifier 12 which is adapted to receive signals in the form of a modulated carrier. The amplifier 12 is adapted to amplify the modulated carrier. The output of the amplifier 12 is applied to the input of a signal detector 14 which demodulates the incoming signals, the demodulated signals then being amplified by a marking signal amplifier 16. The amplified marking signal is then applied through a phasing lockout relay 18 to a scanner or marking unit 20 which preferably takes the form of a helix 22 (FIG. 4) mounted on a cylindrical drum 24 and a linear printer bar 26 (FIG. 2) which cooperate in a well known manner to linearly scan and mark the sensitized medium 28 passing therebetween.

The sensitized medium 28 is a web of paper which is dampened with an electrolytically conductive material adapted to be darkened by the passing of an electric current therethrough. The paper is stored on a roll 29 in a humidor compartment 31 which keeps the moisture from evaporating too fast.

The scanning unit 20 is driven by a synchronous alternating current motor 30 through a set of reduction gears or other speed reducing means 32. The motor 30 may be operated at any suitable speed such as 3600 r.p.m. with the marking unit helix drum 24 being driven at a considerably lower speed such as 360 r.p.m. through the reduction gears 32.

It is, of course, necessary to phase the receiving scanner unit 20 so that it will correspond precisely in its instantaneous position with the transmitting scanner. In the illustrated receiver the scanning unit 20 is phased by causing the drive motor 30 to be retarded progressively in phase until the scanner arrives at the correct phasing position in a manner described fully in U.S. Patent No. 3,013,121, issued to Richard W. Castor December 12, 1961. Briefly, the motor is caused to drop back in phase by momentarily cutting its source of power which causes the motor to slip poles. The power to the motor 30 is cut momentarily by a phasing relay 34 which receives pulses through its driver 36 from phasing multivibrator 37 and motor phasing commutator 38 driven along with the receiver scanning unit 20. The transmitter produces phasing pulses which are synchronized with a predetermined position of the transmitter scanner and these pulses received through the signal amplifier 12, signal detector 14, marking signal amplifier 16 and a phasing lockout relay 18 are transmitted through the motor phasing commutator 38 only when the receiver scanner unit 20 is out of phase with the transmitter scanning unit. Conversely, when the receiver scanner unit 20 is in phase with the transmitter scanner unit the motor phasing commutator 38 blocks the phasing pulses received from the transmitter so that the phasing relay 34 will not cause the momentary deenergizing of drive motor 30.

The transmitter sends the phasing pulses only during the predetermined time period at the beginning of transmission after which it reverts to the video mode to send copy reproduction or facsimile signals. It is desirable, after the receiver has been phased with the transmitter, that the phasing circuits by prevented from momentarily deenergizing the drive motor so that the marking signals will not cause the receiver to become unsynchronized with the transmitter. This is accomplished by the phasing lockout relay 18 which, after a predetermined time interval, closes the circuit for the phasing signals from the output of the marking signal amplifier 16 to the motor phasing commutator 38.

Thus, during the phasing pulse portion of the transmission the circuit from the marking signal amplifier 16 to the motor phasing commutator 38 is completed through the phasing lockout relay. However, the initiation of a transmission as detected at the output of signal amplifier 12 also causes the energization of enabling relay 40 through its driver 42, which prepares time delay relay 44 for subsequent operation. Perhaps 20 to 30 seconds later the time delay relay causes the phasing lockout relay to break the phasing pulse circuit.

The enabling relay 40 which, as mentioned, is operated responsive to the initial receipt of transmission from the transmitter, also serves to start a fast paper feed motor 46, as will be described in detail hereinafter. The motor 46 operates paper feed roller 47 through a speed reduction drive 48 and overriding clutch 50. Thus, at the beginning of transmission the paper 28 is drawn by the paper feed roller 47 past the scanner unit 20 at a relatively fast rate of speed determined by the fast paper feed motor 46 and speed reduction drive 48. After the predetermined time interval, governed by time delay relay 44, the phasing lockout relay causes the deenergization of the fast paper feed motor 46 and the drive of the paper feed roller will be taken over by the drive motor 30 through the speed reduction drive 32, speed reduction drive 52 and overriding clutch 54. When the paper feed roller is being driven by the drive motor 30, the motion of the paper past the scanning unit 30 is synchronized with the motion of the copy being scanned in the transmitter so that there will be no distortion of the image produced at the receiver.

It will be noted that both the drive motor 30 and the fast paper feed motor 46 are started responsive to the enabling relay 40. The overriding clutch 54 between the drive motor 30 and the paper feed roller 47 permits the fast paper feed motor to drive the roller even though the drive motor 30 is in operation. The overriding clutch 50 permits the drive motor to drive the paper feed roller 47 after the phasing period even though the fast paper feed motor 46 has stopped.

Figures 2, 3:
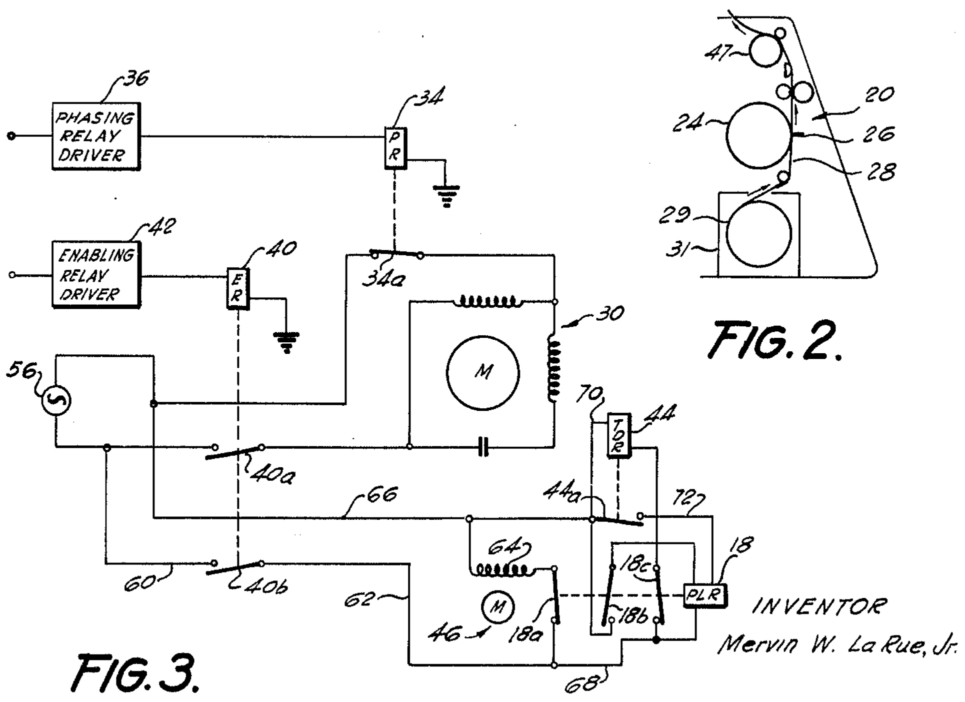
FIG. 2 is a simplified diagram of the paper feed supply and drive mechanisms of a facsimile receiver.
FIG. 3 is a schematic diagram of the electric circuits for the drive motor and the fast paper feed motor.

Reference is now made to FIG. 3 for a more detailed description of electrical circuitry to control the operation of the drive motor 30 and the fast paper feed motor 46. As previously mentioned the enabling relay 40 is energized responsive to the receipt of the beginning of transmission signals in the receiver. The enabling relay 40 completes a circuit through contacts 40*a* from an alternating voltage source 56 to the drive motor 30 to start its operation. It will be noted that this circuit is completed through normally closed contacts 34*a* of the phasing relay 34 and the periodic momentary operation of the phasing relay 34 during the initial phasing period causes the armature 58 to slip back a pole each time the contacts 34*a* are broken. The phasing relay 34 is pulsed until the receiver scanning unit 20 is in phase with the transmitter scanning unit, at which time no further pulses are delivered to the phasing relay from the phasing relay driver 36.

The enabling relay 40 also closes its normally open contacts 40*b* to complete a circuit from the A.C. voltage source 56 to the fast paper feed motor 46 through a circuit including conductor 60, contracts 40*b*, conductor 62, contacts 18*a* of the phasing lockout relay 18, field winding 64 and conductor 66. Thus, the fast paper feed motor 46 is also energized responsive to the operation of enabling relay 40 and it serves to drive the paper feed roller 47 even though the drive motor 30 is operating.

The closing of enabling relay contacts 40*b* also completes a circuit to the time delay relay 44 through the circuit including conductor 60, contacts 40*b*, line 62, conductor 68, contacts 18*c* of the phasing lockout relay, time delay relay 44, conductor 70 and conductor 66. The time delay relay 44 is set to operate a predetermined time interval after energization, for example, 20 to 30 seconds before it closes in its contacts 44*a*. When it does so it completes a circuit to the phasing lockout relay 18 through the circuit including conductor 60, contacts 40*b*, conductor 62, conductor 68, phasing lockout relay 18, conductor 72, contacts 44*a*, and conductor 66. Thus, the phasing lockout relay 18 operates 20 to 30 seconds after the initial operation of enabling relay 40 to lock itself through its own contacts 18*b*.

The phasing lockout relay opens the circuit to the field winding 64 of the fast paper feed motor 46 by means of contacts 18*a* and opens the circuit to the time delay relay 44 by means of the normally closed contacts 18*c*. The driving motor 30, therefore, takes over the paper feed operation to pull the paper past the scanner at the proper scanning rate after the fast paper feed motor 46 has driven the paper at an accelerated rate to insure that moist paper is submitted to the scanner when the facsimile signals are received. The phasing lockout relay 18 is held in operation until the enabling relay 40 drops out to open its contacts 40*b* which transpires at the end of a facsimile transmission.

Figure 4:
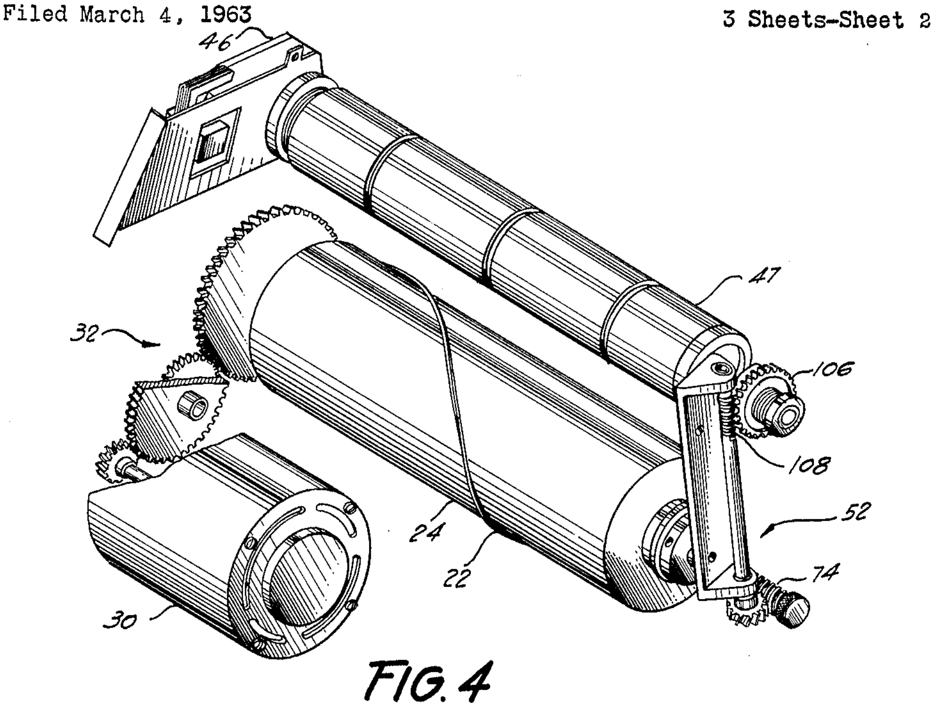
FIG. 4 is an isometric view showing the mechanical drive train for the helix drum and paper feed roller.
Figures 5, 6:
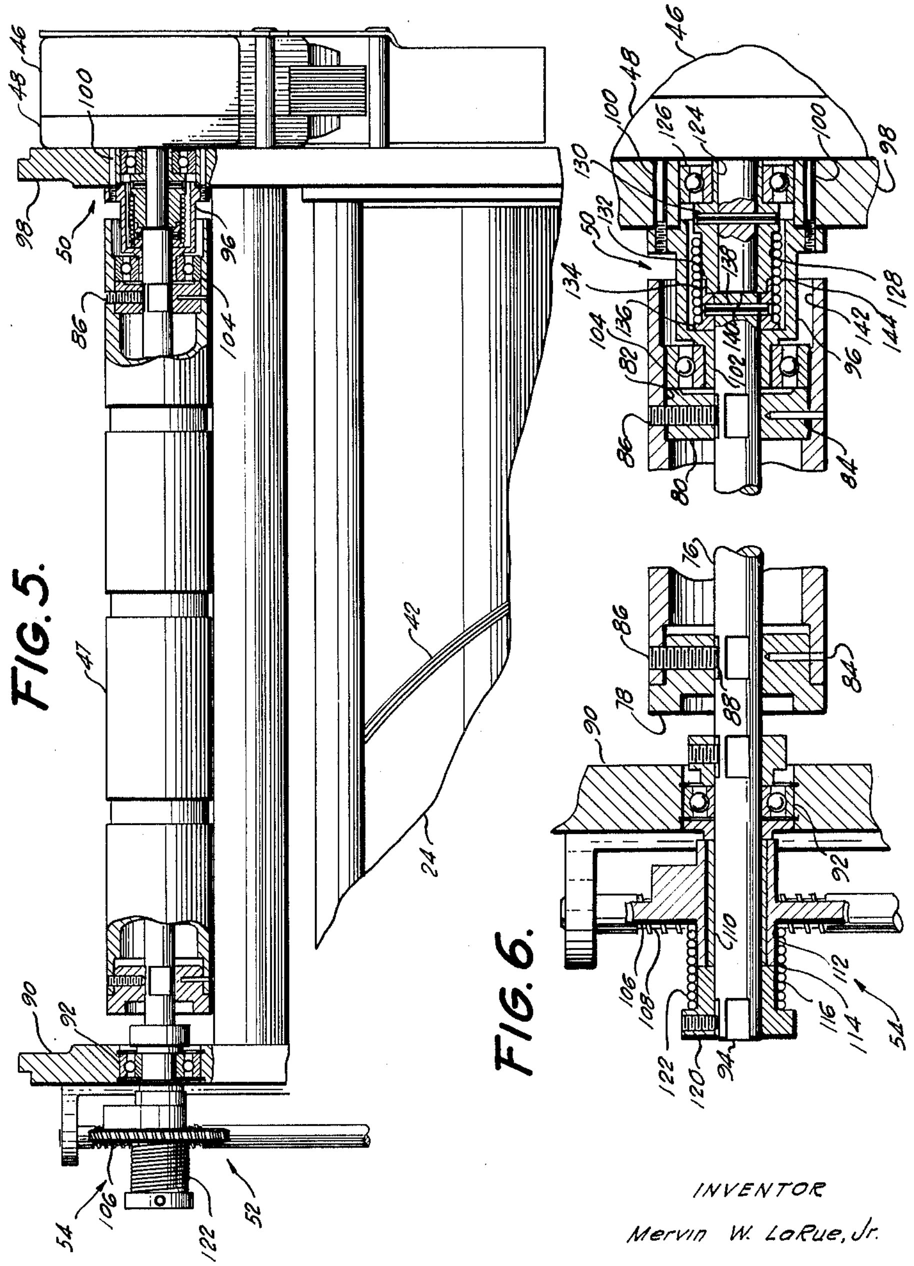
FIG. 5 is an elevation view partially in section of a portion of a facsimile receiver including the copy feed roller and mechanisms associated therewith.
FIG. 6 is an enlarged view of the copy feed roller showing in detail the overriding clutches.

Reference is now made to FIGS. 4 through 6 in which the mechanical features paper drive apparatus are disclosed in detail. The helix drum 24 as shown in FIG. 4 may be driven at a rotational velocity of 360 r.p.m. through the speed reduction drive 32 having a stepped down ratio of approximately 10 to 1. The paper feed roller 47 is driven at a much slower rotational velocity, perhaps approximately .9 r.p.m. through speed reduction drive 52 between the threaded end of the helix drum shaft 74 and one end of the paper drive roller 47.

The fast paper feed motor 46 with an enclosed speed reduction drive referred to in FIG. 1 as reference 48 drives the paper feed roll 47 from its opposite end. The motor 46 through its internal speed reduction drive drives the feed roller at a rotational velocity of perhaps 5 r.p.m. to pull the paper through the receiver at a faster rate of speed during the initial phasing period.

To accommodate the differing speed drives from either end of the paper feed roller there are provided overriding clutch assemblies between the roller ends and the two driving gear trains 32, 52 respectively as shown in FIG. 5. The overriding clutch assemblies 54 and 50 are adapted to permit the fast paper feed motor 46 to operate to turn the roller 47 while the drive motor 30 is still in operation to rotate the helix drum 24 and hence the speed reduction drive 52. The clutches are also adapted to permit the drive motor 30 through speed reduction drives 32 and 52 to drive the roller 47 when the fast paper feed motor 46 is not operating. This is, of course, necessary because of the speed reduction drive 48 enclosed in the housing of the motor 46 which would otherwise serve as a lock to the rotation of the paper feed roller 47. It is to be understood that if there is no speed reduction drive unit between the fast paper feed motor 46 and the roller 47 that overriding clutch 50 may not be necessary since the armature in the motor would rotate freely therein.

The roller 47 is mounted on a shaft 76 by means of a first bushing 78 at one end of the roller 47 and a second bushing 80 internally secured within a bore 82 in the other end of the roller 47. The roller 47 is keyed to the bushings 78 and 80 by means of dowels 84 with the assembly being fixed to the shaft 76 by means of set screws 86 engaging flats 88 on the shaft 76.

The shaft 76 is journaled for rotation in a support member 90 by means of a ball bearing 92 attached to the extended end 94 of the shaft 76. At the other end of the roller 47 is a roller support member 96 which is fixed to a supporting wall 98 by means of bolts 100. The roller 47 is journaled for rotation about the non-bolted end 102 of the roller support member 96 by means of a ball bearing 104.

A worm gear 106 which is in operative engagement with worm 108 in the speed reduction drive 52 is rotatably mounted about the extended end 94 of shaft 76 by means of a bushing 110. The worm gear 106 carries a hub 112 which has an exterior surface 114 having a corresponding diameter with outer surface 116 on a drive nut 120 keyed to the end of the shaft 76. Helical spring 122 snugly grips the adjacent surfaces 114 and 116 on the worm gear hub 112 and drive nut 120, respectively. The spring is wound in a direction such that it will tighten about the surfaces 114 and 116 when the gear 106 is being driven at a faster rate of speed than the shaft 76 and drive nut 120. However, if the shaft 76 and drive nut 120 are driven at a faster rate of speed by the fast paper speed motor 46 the spring 122 will tend to unwind and release its grip on the surfaces 114 and 116 allowing the nut 120 and worm gear 106 to rotate independently of one another.

The overriding clutch 50 between the fast paper feed motor 46 and the roller 47 works in a similar fashion to permit relative rotation between the roller shaft 76 and the drive shaft 124 from the paper feed motor and speed reduction unit. The shaft 124 is journaled for rotation within the supporting wall 98 by means of ball bearings 126 and carries a sleeve 128 which is keyed by pin 130 to rotate therewith. The sleeve 128 has a surface 132 which has a corresponding diameter with surface 134 on a hub 136 keyed by pin 138 to the end 140 of shaft 76 terminating within the bore 142 of the corresponding end of roller 47. A helical spring 144 snugly engages the surfaces 132 and 134 of the sleeve 128 and hub 136, respectively, and is wound in a direction to grip the surfaces whenever the fast feed motor 46 is operating. When the motor 46 is turned off, however, and the roller 47 is being turned by means of the drive motor 30, the helical spring 146 tends to unwind allowing the hub 136 fixed to the shaft 76 to rotate with respect to the sleeve 128 fixed to the fast paper feed motor drive shaft 124.

The above construction permits the enabling relay 40 to turn on both the drive motor 30 and the fast paper feed motor 46 although only the fast paper feed motor is operable to rotate the roller 47. After a predetermined time interval the time delay relay 44 causes the phasing lockout relay to pull in and disconnect the fast paper feed motor 46 to leave the drive motor 30 to rotate the paper feed roll 47 at the normal scanning speed. Thus, during the phasing period at the beginning of transmission the paper which has been exposed to the atmosphere is pulled past the scanning unit 20 before the receipt of facsimile marking signals.

It is to be understood that many modifications and additions may be made to the teachings herein. For example, the enabling relay 40 which readies the receiver to accept the transmission from the transmitter may receive its signal to operate from a source independent of the output of the signal amplifier 12 as described above. It is only necessary that the enabling relay 40 receive a pulse of current from any source responsive to the initiation of operation of the transmitter. It is, therefore, intended that this invention be limited not by the showing herein of a preferred embodiment but only by the scope of the appended claims.

What is claimed is:

1. In a facsimile receiver, the combination comprising a circuit for receiving phasing and facsimile signals, a supply of moist, electrically markable, sensitized paper, a humidifier compartment for storing said paper, means for moving said paper from said humidifier compartment through said receiver at a predetermined rate during receipt of said facsimile signals, and means for driving said paper at a faster rate for a predetermined interval during the receipt of said phasing signals.

2. In a facsimile receiver, the combination comprising a circuit for receiving phasing and facsimile signals, a supply of moist, electrically markable, sensitized paper, a humidifier compartment for storing said paper, a roller for moving said paper from said humidifier compartment through the receiver, a first motor for driving said roller at a predetermined speed, a second motor for driving said roller at a faster speed, and means for rendering said second motor effective to drive said roller only for a predetermined time interval during receipt of said phasing signals.

3. In a facsimile receiver, the combination comprising a circuit for receiving phasing and facsimile signals, a supply of moist, sensitized paper markable by said facsimile signals, a humidifier compartment for storing said paper, a roller for moving said paper from said humidifier compartment through the receiver, a first motor for driving said roller at a predetermined speed, a second motor for driving said roller at a faster speed, means for rendering said second motor effective to drive said roller only for a predetermined time interval during the receipt of said phasing signals, and means for rendering said first motor effective to drive said motor during the remainder of the receipt of said signals.

4. In a facsimile receiver, the combination comprising a circuit for receiving electrical signals including copy reproduction signals from a facsimile transmitter, a supply of moist, electrically markable, sensitized paper, a humidifier compartment for storing said paper, means for moving said paper from said humidifier compartment through said receiver at a predetermined rate during the receipt of said electrical signals pertaining to copy reproduction, and means operative responsive to an initial signal for moving said copy at a faster rate for a predetermined time period after an interval of non-receipt of electrical signals.

5. In a facsimile receiver of the type in which electrical signals cause the reproduction of copy on sensitized paper normally affected by atmospheric conditions, the combination comprising a substantially sealed compartment for storing said paper, means for driving said paper from said compartment through said receiver at a predetermined rate during the receipt of said electrical signals and means responsive to an initial signal for driving said paper at a faster rate immediately prior to the receipt of said electrical signal subsequent to the receipt of an initial signal.

6. In a facsimile receiver, the combination comprising a circuit for receiving signals from a facsimile transmitter, a scanning device, a supply of moist electrolytic paper, a roller for moving said paper past said scanning device, a synchronous motor for driving said scanning device and said roller at a predetermined rate of speed, circuit means including an enabling relay operable responsive to the receipt of said signals for starting said synchronous motor, a second motor for driving said roller at a faster rate of speed, second circuit means including said enabling relay for starting said second motor responsive to the beginning of receipt of said signals, an overriding clutch between said synchronous motor and said roller, and means including a time delay relay for rendering said second motor ineffective to drive said roller after a predetermined time interval.

7. In a facsimile receiver, the combination comprising a circuit for receiving phasing and facsimile signals from a facsimile transmitter, a scanning means, phasing means including a commutator for synchronizing the receiver scanning means with the transmitter, a supply of moist, sensitized paper, electrically markable responsive to said facsimile signals, a roller for moving said paper past said scanning means, a synchronous motor, gearing means in operative association with said synchronous motor for driving said scanning means, said commutator and said roller at predetermined velocities, a second motor, second gear means in operative association with said second motor for driving said roller at a faster predetermined velocity, circuit means including an enabling relay for starting said motors responsive to the initial receipt of said signals, circuit means including a time delay relay for deenergizing said second motor a predetermined time interval after starting, a first overriding clutch in said first gear means for permitting said synchronous motor to drive said roller when said second motor is deenergized, and a second overriding clutch in said gear means for permitting said second motor to drive said roller while said synchronous motor is operating.

8. In a facsimile receiver, the combination comprising a circuit for receiving signals from a facsimile transmitter, a scanning device, a supply of moist, electrolytic paper, a roller for moving said paper past said scanning device, a synchronous motor for driving said scanning device and said roller at a predetermined rate of speed, a second motor for driving said roller at a faster rate of speed, circuit means including an enabling relay for starting said motors responsive to the beginning of receipt of said signals, second circuit means including a time delay relay for deenergizing said second motor a predetermined time interval after starting, a first overriding clutch between said synchronous motor and said roller for permitting said second motor to drive said roller when said synchronous motor is operating and a second overriding clutch between said second motor and said roller for permitting said synchronous motor to drive said roller while said second motor is deenergized.

9. The facsimile receiver of Claim 8 in which each of said clutches comprises a first member rotatable by said first motor about the axis of said roller and having a cylindrical exterior surface concentric about said axis, a second member fixed to said roller adjacent said first member having a cylindrical surface concentric about said axis with a radius equal to the radius of the surface on said first member, and a helical resilient member surrounding and in snug engagement with said surfaces, said helical member being wound in a direction to tighten and seize upon said surfaces when driven by said first member.

10. In a facsimile receiver, the combination comprising a circuit for receiving signals from a facsimile transmitter, a scanning device, a supply of moist, electrolytic paper, a roller for moving said paper past said scanning device, a first motor for driving said scanning device and said roller at a predetermined rate of speed, a second motor for driving said roller at a faster rate of speed, circuit means for starting said motors responsive to the beginning of receipt of said signals, second circuit means for deenergizing said second motor a predetermined time interval after starting, a first overriding clutch between said first motor and said roller for permitting said second motor to drive said roller when said first motor is operating, and a second overriding clutch between said second motor and said roller for permitting said first motor to drive said roller while said second motor is deenergized.

11. The facsimile receiver of claim 10 in which each of said clutches comprises a first member rotatable by said first motor about the axis of said roller and having a cylindrical exterior surface concentric about said axis, a second member fixed to said roller adjacent said first member having a cylindrical surface concentric about said axis with a radius equal to the radius of the surface on said first member, and a helical resilient member surrounding and in snug engagement with said surfaces, said helical member being wound in a direction to tighten and seize upon said surfaces when driven by said first member.

12. In a facsimile receiver, the combination comprising a circuit for receiving signals from a facsimile transmitter, a scanning device, a supply of moist, electrolytic paper, a roller for moving said paper past said scanning device, a first motor for driving said scanning device and said roller at a predetermined rate of speed, a second motor for driving said roller at a faster rate of speed, circuit means for starting said motors responsive to the beginning of receipt of said signals, second circuit means for deenergizing said second motor a predetermined time interval after starting, and an overriding clutch between said first motor and said roller for permitting said second motor to drive said roller when said first motor is operating.

13. The facsimile receiver of claim 12 in which said clutch comprises a first member rotatable by said first motor about the axis of said roller and having a cylindrical exterior surface concentric about said axis, a second member fixed to said roller adjacent said first member having a cylindrical surface concentric about said axis with a radius equal to the radius of the surface on said first member, and a helical resilient member surrounding and in snug engagement with said surfaces, said helical member being wound in a direction to tighten and seize upon said surfaces when driven by said first member.

References Cited by the Examiner

UNITED STATES PATENTS

| | | | |
|---|---|---|---|
| 1,598,595 | 9/1926 | Angus | 346—136 |
| 2,257,918 | 10/1941 | Ressler | 178—5 |
| 2,427,611 | 9/1947 | Lane | 178—5 |
| 2,890,924 | 6/1959 | Norfolk | 346—136 |
| 2,945,997 | 7/1960 | Kennedy | 346—136 |
| 3,085,845 | 4/1963 | Perry | 346—136 |
| 3,135,179 | 6/1964 | Cerasani et al. | 178—6.6 |

DAVID G. REDINBAUGH, *Primary Examiner.*